(12) United States Patent
Mallya et al.

(10) Patent No.: US 8,358,802 B2
(45) Date of Patent: Jan. 22, 2013

(54) METHOD OF TRANSMITTING MEDICAL DATA

(75) Inventors: Rashmi Mallya, Karnataka (IN); Arun Balasubramanian, Karnataka (IN)

(73) Assignee: General Electric Company, Schenectady, NY (US)

( * ) Notice: Subject to any disclaimer, the term of this patent is extended or adjusted under 35 U.S.C. 154(b) by 1575 days.

(21) Appl. No.: 11/534,848

(22) Filed: Sep. 25, 2006

(65) Prior Publication Data

US 2008/0074708 A1 Mar. 27, 2008

(51) Int. Cl.
*G06K 9/00* (2006.01)
*H04N 1/00* (2006.01)

(52) U.S. Cl. ......... 382/100; 382/128; 358/405

(58) Field of Classification Search ........ 382/100, 382/128; 358/405
See application file for complete search history.

(56) References Cited

U.S. PATENT DOCUMENTS

| | | | |
|---|---|---|---|
| 6,564,256 B1 * | 5/2003 | Tanaka | 709/219 |
| 2001/0019587 A1 | 9/2001 | Hashimoto | |
| 2002/0016718 A1 * | 2/2002 | Rothschild et al. | 705/2 |
| 2004/0002327 A1 | 1/2004 | Tanaka | |
| 2005/0187787 A1 * | 8/2005 | Tomlinson et al. | 705/2 |
| 2006/0253502 A1 * | 11/2006 | Raman et al. | 707/202 |
| 2008/0021741 A1 * | 1/2008 | Holla et al. | 705/3 |

* cited by examiner

*Primary Examiner* — Matthew Bella
*Assistant Examiner* — Patrick Edwards (57) ABSTRACT

A method of transmitting a data set comprising at least one medical data from a first imaging station to at least one other imaging station via a network interface in a DICOM standard communication system is provided. The method comprises the acts of selecting a first medical data from the data set for transmission; checking a memory of the first imaging station for a receipt of an acknowledgement signal indicative of a successful transmission of the first medical data to the at least one other imaging station; transmitting the medical data if the act of checking does not detect the receipt of acknowledgement signal; receiving the acknowledgment signal from the at least one other imaging station in response to a successful receipt of the first medical data at the at least one other imagine station; and storing the receipt of acknowledgement signal in the memory of the first imaging station.

20 Claims, 4 Drawing Sheets

METHOD OF TRANSMITTING MEDICAL DATA

BACKGROUND OF THE INVENTION

The subject matter herein relates generally to a method of transmitting data in a communication system and more particularly to a method of transmitting medical data in a DICOM standard communication system.

Digital Imaging and Communication in Medicine (DICOM) is a convention standard employed by communication systems in transferring medical data between a series of imaging stations. A data set comprising one or more medical data may be communicated between the series of imaging stations by establishing a network communication.

A number of reasons such as failure of the network interface, switching between the network interface, failure of one of the imaging stations, restart or reboot of one of the imaging stations or an interrupt such as a manual interrupt or an automatic interrupt can cause a failure in the network communication. The failure in the network communication interrupts the transmission of the data set.

BRIEF DESCRIPTION OF THE INVENTION

In an embodiment, the invention provides a method of transmitting a data set comprising at least one medical data, from a first imaging station to at least one other imaging station via a network interface in a DICOM standard communication system. The method comprises the acts of selecting a first medical data from the data set for transmission; checking a memory of the first imaging station for a receipt of an acknowledgement signal indicative of a successful transmission of the first medical data to the least one other imaging station; transmitting the medical data if the act of checking does not detect the receipt of acknowledgement signal; receiving the acknowledgment signal from the at least one other imaging station in response to successful receipt of the first medical data at the at least one other imagine station; and storing the receipt of acknowledgement signal in the memory of the first imaging station.

In another embodiment, a system operable to transmit a data set comprising at least one medical data, in accordance to a DICOM communication standard is provided. The system includes at least a first imaging station connected in communication with at least one other imaging station. The first imaging station includes a network server in communication with a user interface and a memory. The memory includes a plurality of program instructions for execution by the network server. The plurality of program instructions include the acts of selecting a first medical data from the data set for transmission; checking the memory of the first imaging station for a receipt of an acknowledgement signal indicative of a successful transmission of the first medical data to the least one other imaging station; transmitting the medical data if the act of checking does not detect the receipt of acknowledgement signal; receiving the acknowledgment signal from the at least one other imaging station in response to successful receipt of the first medical data at the at least one other imagine station; and storing the receipt of acknowledgement signal in the memory of the first imaging station.

An embodiment of a computer readable storage medium with a plurality of program instructions for execution by a network server of a first imaging station is provided. The plurality of program instructions allow the first imaging station to transmit a data set including at least one medical data to at least one other imaging station in the communication system. The plurality of program instructions include a routine for receiving a data request signal from a user interface, the data request signal including a data set identifier; a routine for uploading the data set; a routine for selecting a first medical data from the data set; a routine for checking for a receipt of an acknowledgement signal at the first imaging station, the acknowledgment signal indicative of a successful transmission of the first medical data to the at least one other imaging station; a routine for transmitting the first medical data in response to not detecting the receipt of the acknowledgment signal; a routine for receiving the acknowledgment signal, generated in response to receiving the first medical data at the at least one other imaging station; a routine for storing the receipt of acknowledgement signal in a memory of the first imaging station.

Systems and methods of varying scope are described herein. In addition to the aspects and advantages described in this summary, further aspects and advantages will become apparent by reference to the drawings and with reference to the detailed description that follows.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the invention. The following detailed description is, therefore, not to be taken in a limiting sense.

Figure 1:
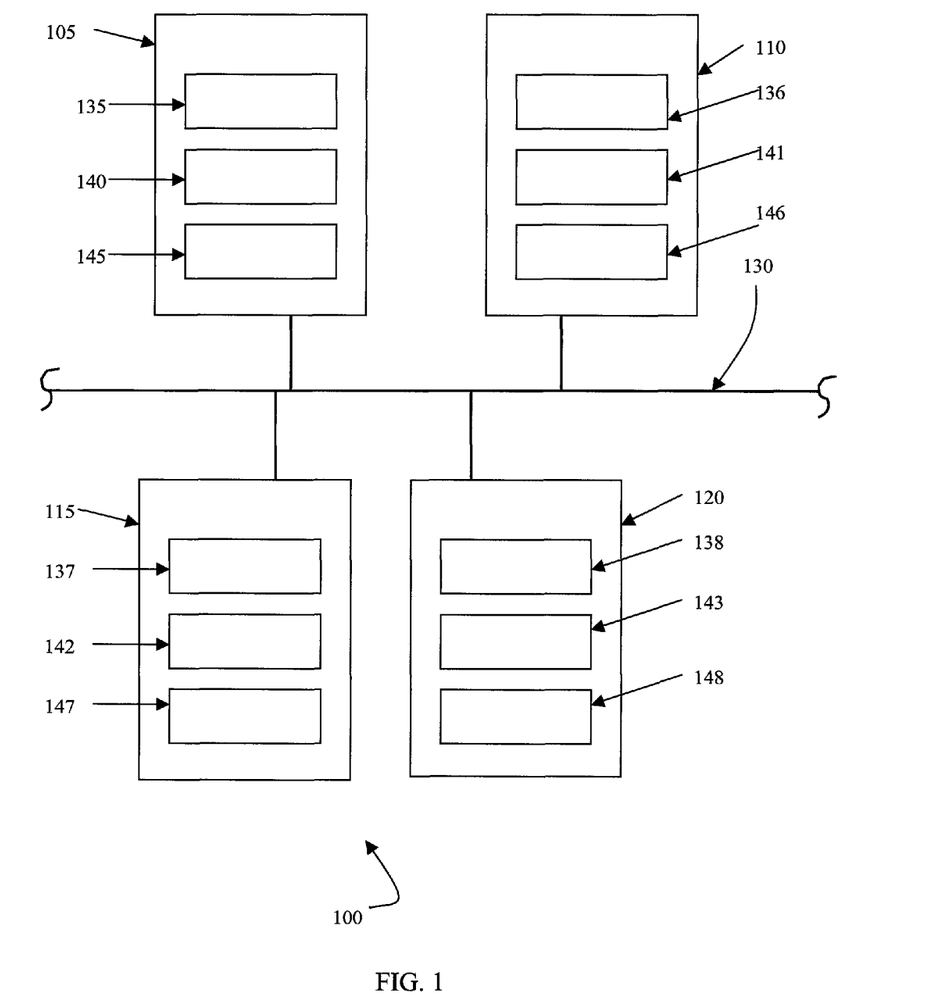
FIG. 1 shows a block diagram of an embodiment of a communication system.

FIG. 1 shows an embodiment of a block diagram of a communication system 100. The communication system 100 can be one of a medical facility such as a hospital or clinic or the like. The communication system 100 comprises multiple imaging stations 105, 110, 115, and 120 each configured to communicate a medical data in accordance with a communication standard such as a DICOM standard. The DICOM standard is a conventional standard for communicating medical data over a network. In particular, the DICOM standard supports a TCP/IP protocol, which is a general communication standard for the Internet. Accordingly, the DICOM standard in combination with the TCP/IP protocol is operable to support the communication of medical data concerning a patient over the Internet or an Ethernet between the imaging stations 105, 110, 115, and 120 manufactured by different makers. Examples of the medical data concerning the patient can include a text, an image, a video, an audio dictation, a waveform data, and combinations thereof. Although FIG. 1 shows four exemplary imaging stations 105, 110, 115 and 120 it is understood that the number of imaging stations can vary.

The series of imaging stations 105, 110, 115, and 120 of the communication system 100 are connected in communication with one another as part of a network 130. An example of the network 130 is a Local Area Network (LAN), such as an Ethernet, installed in the hospital or medical facility. The LAN may also be connected to the Internet or another LAN in another hospital or medical facility via a dedicated line or a public telecommunication line such as ISDN. The network 130 can be interconnected via a hard-wired connection (e.g., cable, bus, etc.) or a wireless connection (e.g., infrared, radio frequency, etc.) or combination thereof.

An embodiment of each of the imaging stations 105, 110, 115, and 120 is one of an imaging modality, an image server or a medical information system. The imaging modality is an apparatus or a system operable to record an image related to a patient as a digital medical data. The imaging modality can be one of an X-ray system, a magnetic resonance imaging (MRI) system, a computed tomography (CT) system, an ultra sonography (US) system, a nuclear medicine (NM) system, a digital fluoroscopy (DF) system, a digital radiography (DR) system and a computer radiography (CR) system. The image server generally stores the medical data recorded by the imaging modality in a medical database. The exemplary embodiment of the imaging modality and the image server are both interfaced in accordance to and/or compatible with the DICOM standard.

Examples of the medical information system include a hospital information system (HIS), a radiology information system (RIS), a clinical information system (CIS) and a picture archival and communication system (PACS) connected in communication to electronic acquire, store, transmit or manage the medical data.

Each imaging station 105, 110, 115, and 120 is provided with a network address for the purpose of identification within the communication system 100. In addition, each of the imaging stations 105, 110, 115 and 120 comprises a user interface 135, 136, 137, and 138; a network server 140, 141, 142, and 143; and a memory 145, 146, 147 and 148.

Each user interface 135, 136, 137, and 138 is generally configured to receive a user input. Examples of the user interface 135, 136, 137, and 138 can include monitors, panels, keyboards, mouse, etc. or combinations thereof equipped with elements operable to enable dialogue with the user. Examples of the elements include menus, windows, dialog boxes, control panels, icons, and tool palettes or combination thereof. Each of the network interface switches is generally operable to switch between a wired network interface and a wireless network interface at random intervals to make use of a performance advantage, and therefore network connectivity is available for a limited time. The ability to resume transmission from where the transmission was interrupted makes use of less bandwidth, thus proving beneficial especially for wireless networks. The network 130 can further include a remote interface operable to receive medical data in a manner similar the user interfaces 135, 136, 137, and 138 described above. Each network server 140, 141, 142, and 143 is generally configured to handle the user requests received from the user interface 135, 136, 137, and 138, respectively, including processing the user input and providing the requested information. Examples of the requested medical information can include, but is not limited to, a single medical data or a data set comprising multiple medical data. The memory 145, 146, 147, and 148 in each imaging station 105, 110, 115 and 120 respectively is generally configured to store the multiple data sets acquired and/or received by the imaging station 105, 110, 115, and 120 respectively. Additionally, the memory 145, 146, 147, and 148 is configured to store the information concerning transmission of each medical data and/or data set from the respective imaging station 105, 110, 115, and 120. The storing of the transmission information in the memory 145, 110, 115, and 120 ensures that the transmission information is available when the respective imaging station 105, 110, 115, and 120 is restarted and rebooted. Having described the general construction of the system 100, the following is general description of an embodiment of a method 200 of operating the system 100.

Figure 2:
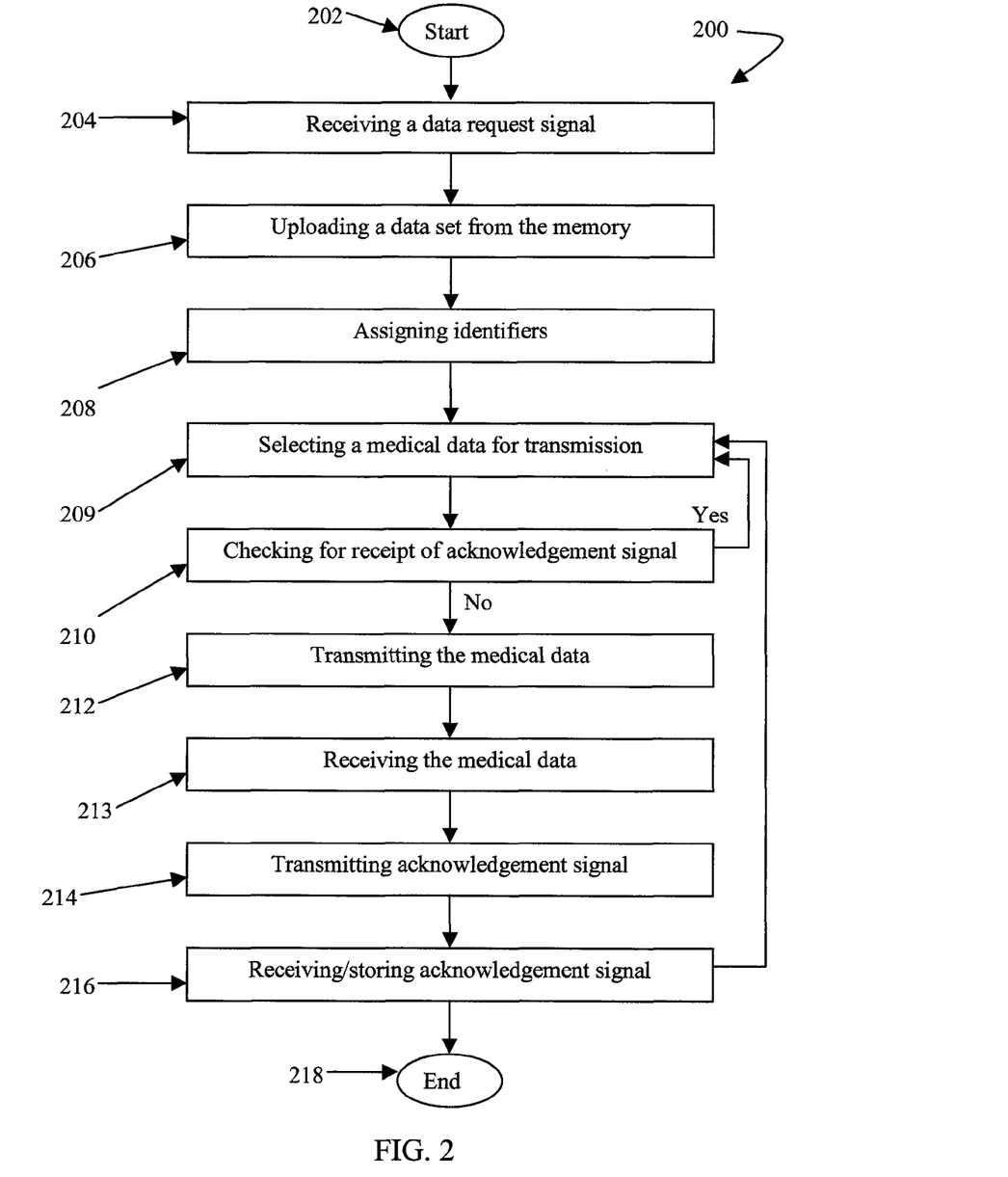
FIG. 2 shows a flow diagram of one embodiment of a method of communicating a data set via the communication system shown in FIG. 1.

FIG. 2 illustrates an embodiment of the method 200 of transmitting a data set comprising at least one medical data, from the first imaging station 105 to the second imaging station 110 via the network interface 150 in the communication system 100. Although the method 200 is described with respect to transmitting the data set from the imaging station 105 to 110, it should be understood that the method can be applied to transmitting data set between any combination of the imaging stations 105, 110, 115, and 120 in the communication system 100 and in any direction.

Act 202 is the start of the method 200. Act 204 includes receiving a data request signal from a user input at the user interface 135 to transmit a data set stored in the memory 145 of the first imaging station 105 to the second imaging station 110. Act 206 includes instructing the network server 140 of the first imaging station 105 to select or upload the data set from the memory 145 in accordance to the data request signal. Act 208 includes assigning an identifier to each of the medical data comprising the data set. Act 209 includes selecting a first medical data having a first identifier from the data set stored at the first imaging station 105 for transmission to the second imaging station 110.

Act 210 includes checking or verifying the memory 145 for a receipt of an acknowledgement signal indicative of a successful transmission of the first medical data having the first identifier from the first imaging station 105. If receipt of an acknowledgement signal for the first medical data is detected, then the first medical data is not transmitted and the method 200 returns to act 209 to select a second medical data of the data set for transmission.

A non-receipt or absence of receipt of the acknowledgment signal for the first medical data in the directory indicates that the first medical data was either not transmitted or failed in a first attempt of transmission. The transmission of the medical data of the data set may fail for various reasons, including but not limited to, a failure of one of the imaging stations 105 and 110, a failure of the network interface, a switching between the network interface, a restart or reboot of one of the imaging stations 105 and 110, and an automatic or a manual interruption in the network interface between the first and second imaging stations 105 and 110.

Assume there has been no previous attempt to communicate the first medical data of the data set, so accordingly there is no detection in the memory 145 at the first imaging station 105 of a receipt of an acknowledgement signal indicative of successful transmission of the first medical data having the first identifier. If the receipt of acknowledgement signal is not detected, act 212 includes transmitting the first medical data of the data set to the second imaging station 110. Assume successful transmission of the first medical data of the data set at the second imaging station 110. Act 213 includes receiving the first medical data having the first identifier at the second imaging station 110. In response to receiving the first medical data, act 214 includes transmitting an acknowledgement signal indicative of the receipt of the first medical data having the first identifier at the second imaging station 110. Act 216 includes receiving and storing a receipt of the acknowledgment signal from the second imaging station 110 in the memory 145 of the first imaging station 105.

In response to the act 216 of receiving and storing receipt of acknowledgement signal, the method 200 repeats acts 209, 210, 212, 213, 214 and 216 for the remaining medical data in the data set until all of the data set is successfully transmitted to the second imaging station 110. Act 218 is the end of the method 200.

Figure 3:
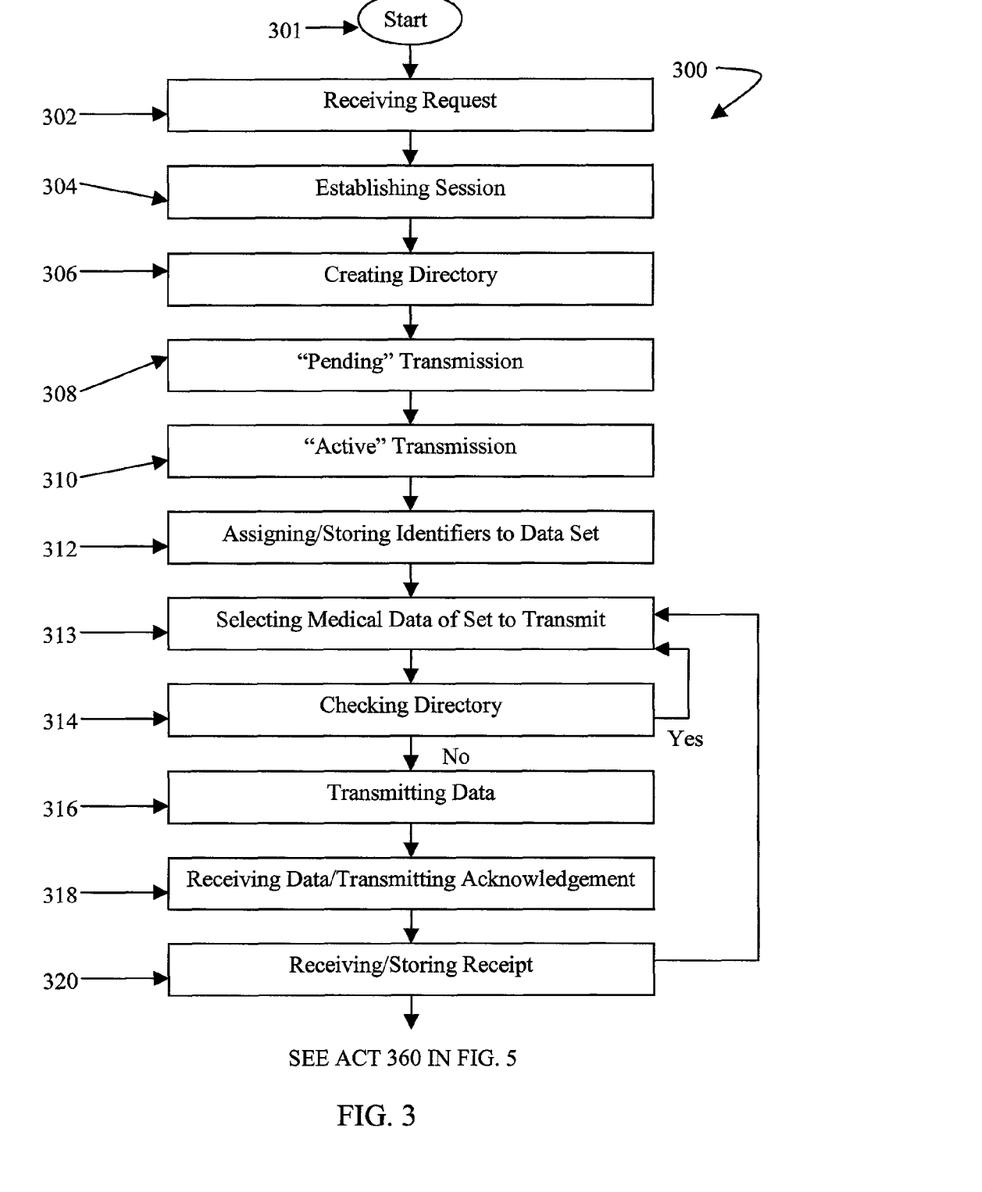
FIG. 3 shows a flow diagram of another embodiment of a method of communicating a data set via the communication system shown in FIG. 1.

FIG. 3 illustrates another embodiment of a method 300 of transmitting or communicating a data set comprising at least one medical data from the first imaging station 105 to the second imaging station 110. Assume for sake of example that there are ten medical data comprising the data set. Act 301 is the start of the method 300. Act 302 includes receiving a data request signal representative of a request received at the user interface 135 of the first imaging station 105. For sake of example, the request is for transmitting a data set from the memory of the first imaging station 105 to the second imaging station 110. The data request signal generally includes a data set identifier for the data set and a network or node address for the second imaging station 110. However, it should be understood that the request can be for communicating a data set between any combination of the imaging stations 105, 110, 115, and 120 in the communication system 100.

Act 304 includes establishing a session between the network server 140 and the user interface 135 of the first imaging station 105 in response to the data request signal. The session generally includes the transmission and/or reception of multiple medical data and/or data sets occurring at the respective imaging station 105. Act 304 also includes assigning a session identifier to the respective session established between the user interface 135 and the network server 140. The session identifier (e.g., session ID) is a unique identification for a session in the communication system 100. Act 306 includes creating a directory to store the receipt of acknowledgement signal corresponding to each medical data in the data set in the memory 145 of the first imaging station 105. An example of the directory can include the path <PersistencyPath/ Node_SessionID_JobHandle/sopInstances> which uniquely identifies the receipt of acknowledgment signals for a data set for a particular session with a particular node or remote imaging station 110, 115, and 120.

Act 308 includes creating and/or updating a transmission status identifier or job state and storing the transmission status identifier in the memory 145 of the first imaging station 105. The transmission status identifier generally indicates a status of transmission of the data set from the first imaging station 105 to the second imaging station 110. The transmission status identifiers can be communicated to the user for illustration, via the user interface 135. Examples of the transmission status identifier include the following: pending, active, cancelled/failed, success and paused. Yet, the transmission status identifiers can vary. The transmission status identifier can be updated as "cancelled/failed" upon receiving a user command via the user interface 135 to cancel transmission of the data set. The transmission status identifier can be updated as "paused" upon receiving an interrupt of the transmission, such as by the user via the user interface 135.

At this point of the method 300, the transmission status identifier is reassigned as "pending" as indicative that the network server 140 is in the process of retrieving the data set from the memory 145 in accordance to the user request, and yet transmission of the data set to the second imaging station 110 has not started. Act 310 includes commencing transmission of the data set corresponding to the data set identifier, from the first imaging station 105 to the second imaging station 110, and re-assigning or updating and storing the transmission status identifier as "active" as an indication of the act 310 of commencing transmission of the data set.

Act 312 includes the network server 140 assigning and storing an identifier to each of the series of medical data comprising the data set, and selecting a first of the series of medical data for transmission to the second imaging station 110. Act 313 includes selecting a first medical data having a first identifier from the data set for transmission. Act 314 includes checking the directory stored in the memory 145 of the first imaging station 105 for presence of a receipt of acknowledgement signal corresponding to the first identifier of the first medical data. Each of the session identifier, the identifiers of the medical data comprising the data set, data set identifiers, transmission status identifiers, the network address, and the receipt of acknowledgement signal may include numerical, alphabetic, alphanumeric and other characters and symbols, conventional or arbitrary, as may be desired.

If receipt of an acknowledgement signal for the first medical data is detected, then the first medical data is not transmitted and the method 300 returns to act 312 for selecting another of the series of medical data comprising the data set, for transmission. For sake of example, a non-receipt or absence of receipt of the acknowledgment signal for the first medical data in the directory can indicate that the first medical data was either not transmitted or failed in a first attempt of transmission. Assuming there has been no previous attempt to transmit the first medical data yet, there is no detection of receipt of an acknowledgement signal for the first medical data in the directory corresponding to the data set as created in the memory 145 of the first imaging station 105.

Act 316 includes transmitting the first medical data of the data set to the second imaging station 110. If the transmission of the medical data succeeds, act 318 includes creating the acknowledgment signal corresponding to the first medical data at the second imaging station 110 for transmission to the first imaging station 105. Act 320 includes receiving and storing receipt of acknowledgement signal corresponding to the first medical data in the directory. In one embodiment, the act 320 of storing the receipt of the acknowledgment signal includes storing an empty (zero-byte) file that comprises the receipt of the acknowledgement signal as the file name. The technique of saving the receipt of the acknowledgment signal as an empty (zero-byte) file provides a quick and easy access to this information in the directory.

Following the act 320 receiving and storing of the receipt of acknowledgement signal from the second imaging station 110, the method 300 returns to act 313 selecting another of the series of medical data from the data set for transmission. The method 300 includes repeating the act 313 of selecting, the act 314 of searching or checking, the act 316 of transmitting one of the series of medical data, the act 318 of receiving the medical data and transmitting an acknowledgement signal, and the act 320 of receiving and storing the receipt of acknowledgement signal in the memory 145 for the remainder of the series of medical data of the data set.

Figure 4:
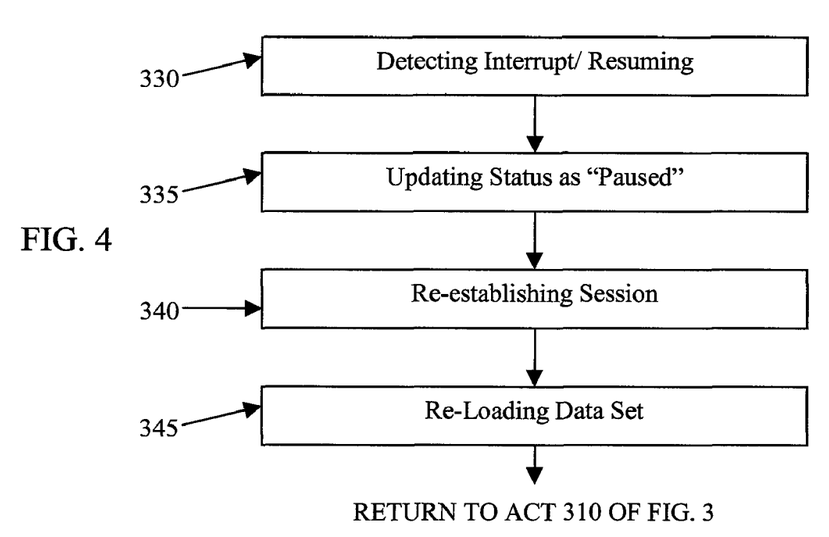
FIG. 4 illustrates a flow diagram of an embodiment of a continuation of the method shown in FIG. 3, the method in response to an interrupt in the transmission of the data set.

However, if the transmission of the first medical data was not successful or was interrupted, no acknowledgement signal would be sent to the first imaging station 105. For sake of example, assume transmission of the data set was interrupted after the successful transmission of eight of the ten medical data of the data set. The cause of the interruption can vary, such as switching between a wired and a wireless network interface. Referring now to FIG. 4, act 330 includes detecting the interrupt. The act 330 can occur at any point of the method 300. Act 335 includes updating the transmission status identifier as "paused." Act 340 includes re-establishing the session having the session identifier with the user interface 135. Assume that the directory corresponding to the data set at the time of receiving the interrupt comprises the receipts of the acknowledgment signals for all the eight medical data that were successfully transmitted to the second imaging station 110. Act 345 includes instructing the network server 140 to re-acquire or upload the data set corresponding to the data set identifier from the memory 145. Act 345 includes instructing the network server 140 to retrieve the information stored in the directory of the memory 145. The information retrieved by the network server 140 can include the session identifier, the data set identifier, and the transmission status identifier amongst the other items comprising the directory. The method 300 then resumes with act 310 of instructing the network server 140 to commence transmission and continuing thereon for the remainder of the data set.

The directory has stored receipt of acknowledgement signals for the first eight of the ten medical data in the data set that were successfully transmitted, and has no receipts of acknowledgement signals for the remaining ninth and tenth medical data of the data set that were not transmitted. The act 314 of checking will avoid re-transmitting the first eight medical data that were already transmitted to the second imaging station 110. Acts 313 and 314 will be repeated until the ninth or tenth medical data of the data set are for transmission.

The act 314 of checking for the receipt of the acknowledgment signal occurs prior to the act 316 of transmitting the medical data of the data set to the second imaging station 110. Hence, the method 300 reduces a likelihood of an undesirable act of duplicating transmission of the series of medical data of the data set.

Figure 5:
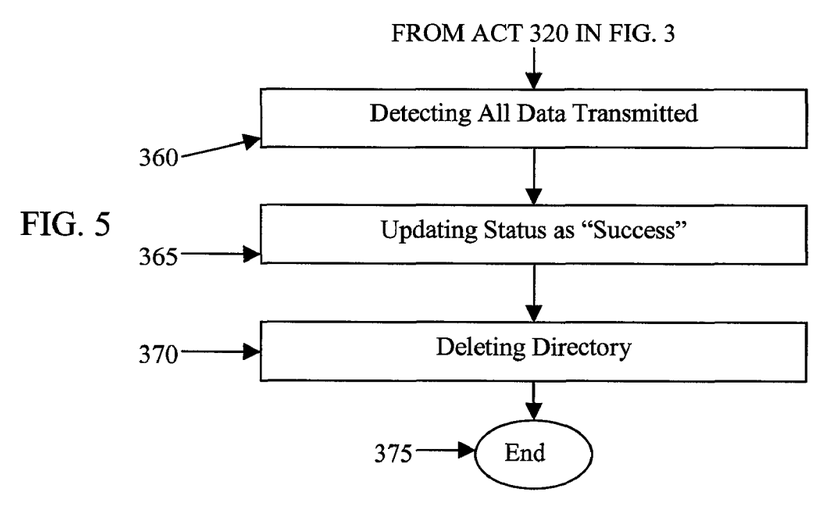
FIG. 5 illustrates a flow diagram of an embodiment of a continuation of the method shown in FIG. 3, the method in response to successful transmission of the data set.

Ultimately, receipts of the acknowledgement signals for all of the medical data comprising the data set will be stored in the directory at the memory 145 of the first imaging station 105. Act 360 includes detecting the receipt of acknowledgment signals for all the medical data in the data set stored in the directory of the memory 145. In response, act 365 includes updating or re-assigning the transmission status identifier as "success." Act 370 includes instructing the network server 140 to delete the directory corresponding to the data set. The act 370 can also be executed in response to a command received via a user input at the user interface 135 to cancel the transmission of the data set. In this example, the transmission status identifier can be updated as "cancelled." Act 475 is the end of the method 300.

In yet another embodiment, the methods 200 and 300 of transmitting medical data can further include simultaneous acquisition or installation of at least one additional medical data at the imaging station 105 while transmission of other medical data is "active." The additional medical data installed and/or acquired during the transmission can be transmitted to another imaging station 110, 115 and 120 upon receiving a user input.

In yet another embodiment, the methods 200 and 300 of transmitting the medical data can further include the act of installing and/or acquiring at least one additional medical data in an interval between an interruption and resumption of a transmission of a data set.

For example, assume act 302 includes receiving a data request signal to communicate a data set comprising ten medical images, from the first imaging station 105 to one or more of the other imaging stations 110, 115 and 120. The method 200 and 300 can further include the act of acquiring two additional medical images at the first imaging station 110, the two additional medical images to form a part of the data set designated for transmission. Upon successfully transmitting the non-additional medical images in the data set from the first imaging station 105 to one or more of the other imaging stations 110, 115 and 120, the method 300 can further include the act of receiving a user input via the user interface 135 that includes a command or instruction to retransmit the data set, including the two additional images added under the same data set identifier. Upon receiving the data request signal from the user interface 135, the method can further include the act of uploading the data set corresponding to the data set identifier specified in the data request signal from the memory 145 to the network server 140. Upon uploading the data set, the method 300 of transmitting the data set resumes for the additional medical images, because the directory stored in the memory 145 already includes receipts of the acknowledgement signals for the previously transmitted medical images of the data set.

In one embodiment of the system 100, the methods 200 and 300 described above are stored as a series of program instructions on a computer readable storage medium for execution by a processor or the network server 140. The program instructions can be structured to comprise a routine for each of the acts or combinations thereof comprising the methods 200 and 300. The computer readable storage medium can be one or more of a computer floppy disk, a computer CD-ROM disk, a computer hard-drive, or other conventional computer readable storage medium. The above description of the embodiments of the system 100, the methods 200 computer readable storage medium have the technical effect of transmitting information that helps a user to obtain significant information about a status of the transmission, whether successful, paused and/or interrupted. Retrieval of the status of the transmission helps a user in making a decision to resume or cancel the transmission of the medical data at a later time. Further, the methods 200 and 300 provide the technical effect of transmitting information such that a likelihood of losing information is reduced when an imaging station 105, 110, 115 and 120 is restarted or rebooted.

It should be understood that the methods 200 and 300 are not limited to the acts described above, and may comprise additional acts. Also, it should be understood that the description of the methods 200 and 300 are exemplary such that one or more acts need not be performed to execute the methods 200 and 300. Still also, the sequence of the above described acts comprising the methods 200 and 300 can vary and is not limiting, unless indicated otherwise.

Although the system 100 and methods 200 and 300 are described with reference to technical effect to transmit the data set from the first imaging station 105 to the second imaging station 110, the system 100 and methods 200 and 300 are not so limited. The technical effect of the system 100 and methods 200 and 300 can include a simultaneous transfer of the data set to multiple imaging stations 105, 110, 115, and 120 in the communication system 100. For example, the act 302 can include receiving an instruction to transmit a data set comprising medical images from the first imaging station 105 to all of the imaging stations 110, 115, and 120 across the communication system 100. The act 306 can include instructing the network server 140 to create and store multiple directories, each directory for storing the receipt of acknowledgement signals received from each of the receiving stations 110, 115, and 120. The act 306 of creating and storing a separate directory for each receiving station 110, 115, and 120 corresponding to the first imaging station's 105 transmission of the data set enhances a correct resumption of the transmission of the data set to each of the multiple receiving stations 110, 115, and 120, such as following a pause or interruption.

The system 100 and the methods 200 and 300 also provide the technical effect and are operable to communicate multiple data sets to multiple imaging stations 105, 110, 115, and 120 of the communication system 100. For sake of example, the act 302 can include receiving a request to simultaneously communicate a first data set comprising a pair of medical images from the first imaging station 105 to the second imaging station 110, and to communicate a second data set comprising five medical images from the first imaging station 105 to a third imaging station 115.

Various embodiments of methods 200 and 300 of transmitting or communicating medical data in a DICOM standard communication system are described above. However, the embodiments describe a broad concept of the methods 200 and 300 of communicating data, and are not limiting and may be implemented in connection with different applications or communication standards in a communication system using various forms and specifications.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of transmitting a data set comprising at least one medical data, from a first imaging station to at least one other imaging station via a network interface of a DICOM standard communication system, the method comprising the acts of:
    assigning a data identifier to each medical data in the data set;
    selecting a first medical data with a first data identifier from the data set for transmission;
    checking a memory of the first imaging station for a receipt of a first acknowledgement signal indicative of a successful transmission of the first medical data having the first data identifier to the at least one other imaging station, wherein the memory of the first imaging station is checked prior to transmitting the first medical data;
    transmitting the first medical data from the first imaging station if the act of checking does not detect the receipt of the first acknowledgement signal;
    transmitting a second medical data having a second data identifier from the first imaging station if the act of checking detects the receipt of the first acknowledgment signal;
    receiving the first acknowledgment signal from the at least one other imaging station in response to successful receipt of the first medical data at the at least one other imaging station or receiving a second acknowledgment signal from the at least one other imaging station in response to successful receipt of the second medical data at the at least one other imaging station; and
    storing the receipt of the first or second acknowledgement signal in the memory of the first imaging station.

2. The method of claim 1, the method further comprising the acts of:
    receiving a request at a user interface of the first imaging station to transmit the data set from the first imaging station to the at least one other imaging station;
    establishing a session between the user interface and a network server of the first imaging station;
    assigning a session identifier to the session;
    creating a directory in the memory of the first imaging station;
    storing the session identifier in the memory;
    storing a transmission status identifier in the memory, the transmission status identifier representing a status of the transmission of the data set; and
    uploading the data set in accordance with the data request signal, from the memory of the first imaging station.

3. The method of claim 1, wherein the network interface of the first imaging station comprises both a wired network interface and a wireless network interface.

4. The method of claim 2, the method further comprising the act of updating the transmission status identifier as PAUSED in response to detecting an interrupt in transmission.

5. The method of claim 4, wherein the interrupt is at least one of a failure in the network interface, a failure of the first imaging station, a failure of the at least one other imaging station, a switching between the network interface, a restart of the first imaging station, a rebooting of the first imaging station, a restart of the at least one other imaging station, a rebooting of the at least one other imaging station, a manual interrupt and an automatic interrupt.

6. The method of claim 2, wherein the method further comprises the act of updating the transmission status identifier as SUCCESS upon detecting the receipt of an acknowledgement signal for each medical data in the data set, in the memory of the first imaging station.

7. The method of claim 6, wherein the method further comprises the act of deleting the directory in response to the act of updating the transmission status identifier as SUCCESS.

8. The method of claim 1, wherein the act of storing the receipt of the first or second acknowledgement signal is in a zero byte file at the first imaging station.

9. The method of claim 1, comprising selecting the second medical data with the second data identifier from the data set for transmission.

10. The method of claim 9, comprising, in response to detecting the receipt of the second acknowledgement signal, selecting a third medical data of the data set for transmission.

11. A system operable to transmit a data set comprising at least one medical data, in accordance to a DICOM communication standard, the system comprising:
    a first imaging station communicatively coupled to at least one other imaging station, the first imaging station including a network server in communication with a user interface and a memory, the memory including a plurality of program instructions for execution by the network server, the plurality of program instructions including the acts of:
    assigning a data identifier to each medical data in the data set;
    selecting a first medical data with a first data identifier from the data set for transmission;
    checking the memory of the first imaging station for a receipt of a first acknowledgement signal indicative of a successful transmission of the first medical data having the first data identifier to the at least one other imaging station, wherein the memory of the first imaging station is checked prior to transmitting the first medical data;
    transmitting the first medical data from the first imaging station if the act of checking does not detect the receipt of the first acknowledgement signal;

transmitting a second medical data having a second data identifier from the first imaging station if the act of checking detects the receipt of the first acknowledgment signal;

receiving the first acknowledgment signal from the at least one other imaging station in response to successful receipt of the first medical data at the at least one other imaging station or receiving a second acknowledgment signal from the at least one other imaging station in response to successful receipt of the second medical data at the at least one other imaging station; and storing the receipt of the first or second acknowledgement signal in the memory of the first imaging station.

12. The system of claim 11, wherein the network interface comprises both a wired network interface and a wireless network interface.

13. The system of claim 11, wherein the program instruction further comprises the acts of:

updating a transmission status identifier as PAUSED in response to detecting an interrupt in the transmission of the data set.

14. The system of claim 13, wherein the interrupt is at least one of a failure in the network interface, a failure of the first imaging station, a failure of the second imaging station, a switching between the network interface, a restart of the first imaging station, a rebooting of the first imaging station, a restart of the second imaging station, a rebooting of the second imaging station, a manual interrupt and an automatic interrupt.

15. The system of claim 11, wherein the program instructions further comprise the act of updating the transmission status identifier as SUCCESS in response to detecting the receipt of an acknowledgement signal for each medical data in the data set.

16. The system of claim 15, wherein the program instructions further comprise the act of deleting the directory in response to updating the transmission status identifier as SUCCESS.

17. The system of claim 11, wherein the program instructions further comprise the act of storing the receipt of the first or second acknowledgement signal in a zero byte file.

18. A non-transitory computer readable storage medium with a plurality of program instructions for execution by a network server of a first imaging station, so as to transmit a data set comprising at least one medical data to at least one other imaging station, the plurality of program instructions including:

a routine for receiving a data request signal from a user interface, the data request signal comprising a data set identifier, wherein the routine for receiving a data request signal is stored on the non-transitory computer readable storage medium;

a routine for configuring the first imaging station to transmit the medical data via a network interface;

a routine for assigning a data identifier to each medical data in the data set;

a routine for selecting a first medical data with a first data identifier from the data set;

a routine for checking for a receipt of a first acknowledgement signal at the first imaging station, the first acknowledgment signal indicative of a successful transmission of the first medical data having the first data identifier to the at least one other imaging station, wherein checking for a receipt of the first acknowledgment signal occurs prior to transmitting the first medical data;

a routine for transmitting the first medical data from the first imaging station in response to not detecting the receipt of the first acknowledgment signal;

a routine for transmitting a second medical data having a second data identifier from the first imaging station in response to detecting the receipt of the first acknowledgment signal;

a routine for receiving the first or second acknowledgment signal, generated in response to receiving the first medical data at the at least one other imaging station or in response to receiving the second medical data at the at least one other imaging station; and a routine for storing the receipt of the first or second acknowledgement signal in a memory of the first imaging station.

19. The non-transitory computer readable storage medium of claim 18, wherein the routine for configuring the first imaging station comprises:

a routine for establishing a session between the user interface and a network server of the first imaging station;

a routine for assigning a session identifier;

a routine for creating a directory to store the receipt of an acknowledgment signal corresponding to each medical data in the data set;

a routine for storing the session identifier, the data set identifier, each data identifier, and the directory in the memory;

a routine for storing a transmission status identifier in the memory, the transmission status identifier representing a status of transmission of the data set;

a routine for obtaining the data set corresponding to the data set identifier from the memory; and a routine for updating the transmission status identifier as ACTIVE.

20. The non-transitory computer readable storage medium of claim 18, wherein the network interface comprises both a wired network interface and a wireless network interface.

* * * * *